United States Patent
Tsai et al.

(10) Patent No.: US 8,051,920 B2
(45) Date of Patent: Nov. 8, 2011

(54) IMPACT DRILL

(75) Inventors: Kim Y.C. Tsai, Taichung County (TW);
Cheng-I Teng, Taichung County (TW);
Jeng-Da Tsai, Taichung County (TW)

(73) Assignee: Mobiletron Electronics Co., Ltd.,
Taichung County (TW)

( * ) Notice: Subject to any disclaimer, the term of this patent is extended or adjusted under 35 U.S.C. 154(b) by 348 days.

(21) Appl. No.: 12/537,351

(22) Filed: Aug. 7, 2009

(65) Prior Publication Data

US 2011/0030985 A1 Feb. 10, 2011

(51) Int. Cl.
*B25D 11/00* (2006.01)
(52) U.S. Cl. ............ 173/29; 173/48; 173/178; 173/217; 279/19.5; 279/75
(58) Field of Classification Search ............. 173/178, 173/48, 128, 104, 93, 217, 29; 279/19.1, 279/19.5, 143, 75; 81/473
See application file for complete search history.

(56) References Cited

U.S. PATENT DOCUMENTS

| 6,142,242 | A  | * | 11/2000 | Okumura et al. | 173/48 |
| 6,550,786 | B2 | * | 4/2003  | Gifford et al. | 279/75 |
| 7,168,503 | B1 | * | 1/2007  | Teng | 173/48 |
| 7,308,948 | B2 | * | 12/2007 | Furuta | 173/48 |
| 7,334,646 | B2 | * | 2/2008  | Hara et al. | 173/176 |
| 7,410,007 | B2 | * | 8/2008  | Chung et al. | 173/48 |
| 7,793,572 | B2 | * | 9/2010  | Hirt et al. | 81/473 |
| 7,828,074 | B2 | * | 11/2010 | Tsubakimoto et al. | 173/178 |
| 7,896,097 | B2 | * | 3/2011  | Teng | 173/48 |

* cited by examiner

*Primary Examiner* — Scott A. Smith
(74) *Attorney, Agent, or Firm* — Browdy and Neimark, PLLC

(57) ABSTRACT

An impact drill includes a housing having an accommodation chamber and a through hole extending from the accommodation chamber to the outside space, a driving mechanism mounted in the accommodation chamber and having a transmission shaft positioned in the through hole for providing an output torque and producing an impact force intermittently upon a resistance, the transmission shaft having a polygonal front segment extending out of the accommodation chamber, and a chuck unit, which has a drill chuck that has a connection barrel defining a polygonal coupling hole that is press-fitted onto the polygonal front segment of the transmission shaft and a first bearing mounted on the connection barrel and received in the through hole to secure the drill chuck to the housing.

11 Claims, 8 Drawing Sheets

IMPACT DRILL

BACKGROUND OF THE INVENTION

1. Field of the Invention

The present invention relates to a power hand tool and more particularly, to the assembly structure of an impact drill.

2. Description of the Related Art

A conventional power hand tool comprises an electrical motor and a spindle rotatable by the electrical motor to provide an output torque. Subject to different applications, conventional power hand tools include electrical screwdrivers, electrical wrenches and electrical hand drills. Further, to overcome the resistance encountered during operation, conventional power hand tools have a function to output an impulse force intermittently.

For example, when an electrical drill encounters a resistance, the spindle will be forced to move intermittently in an axial direction, outputting an impulse force and overcoming the resistance. This axial striking action is called hammer.

Further, when an electrical wrench encounters a resistance during its operated to fasten a hexagonal bolt to a workpiece or unfasten it from the workpiece, the electrical wrench forced to move intermittently in a radial direction (the direction of rotation), outputting an impulse force and overcoming the resistance. This radial striking action is called impact.

However, when operating an electrical hand drill to drill a hole on a workpiece, the spiral cutting edge of the drill bit encounters a resistance in an axial direction as well as in a radial direction. In this case, the hammer function can simply overcome the resistance in the axial direction but cannot overcome the resistance in the radial direction. Under certain situations, the impact function helps drilling performance of the electrical hand drill. FIGS. 5 and 6 show a drill chuck 100 for use with an electrical wrench 200, for example, De Walt model DW0521. The drill chuck 100 has a hexagonal rod 110. The electrical wrench 200 has a coupling hole for receiving the hexagonal rod 110 so that the electrical wrench 200 is usable as an electrical drill. By means of the impact effect, the electrical wrench 200 works efficiently during a drilling operation. However, because this design simply uses the hexagonal rod 110 to achieve transfer of a rotary driving force between the electrical wrench 200 and the drill chuck 100, the drill chuck 100 tends to vibration during a drilling operation, affecting hole size control.

FIG. 7 shows another structure of electrical wrench 300 that has a rectangular spindle 310 for the mounting of a drill chuck 400. After connection of the drill chuck 400 to the electrical wrench 300, the assembly is used as an impact drill. However, this structure is a detachable design, having a relatively greater range of tolerance to facilitate mounting and dismounting of the drill chuck 400. Therefore, when the drill chuck 400 is sued with the electrical wrench 300 to drill a hole, the drill chuck 400 tends to vibration, not suitable for high precision drilling application.

SUMMARY OF THE INVENTION

The present invention has been accomplished under the circumstances in view. It is the main object of the present invention to provide an impact drill for outputting a torsional driving force and providing an impact force in a radial direction (rotating direction) intermittently upon a resistance.

It is another object of the present invention to provide an impact drill, which has the chuck unit thereof firmly secured to the other component parts of the impact drill such that, under normal use, the chuck unit is not detachable and can be rotated smoothly by the driving mechanism of the impact drill.

To achieve these and other objects of the present invention, an impact drill comprises a housing, a driving mechanism and a chuck unit. The housing comprises an accommodation chamber and a through hole in communication between the accommodation chamber and the space outside the housing. The driving mechanism is accommodated in the accommodation chamber, comprising a transmission shaft positioned in the through hole for providing a torque and producing an impact force in the direction of rotation intermittently upon a resistance. The transmission shaft has a polygonal front segment extending out of the accommodation chamber. The chuck unit comprises a drill chuck and a first bearing, which has a connection barrel defining therein a polygonal coupling hole that is press-fitted onto the polygonal front segment of the transmission shaft, and said first bearing mounted on the connection barrel and received in the through hole to secure the drill chuck to the housing.

DETAILED DESCRIPTION OF THE INVENTION

Figure 1:
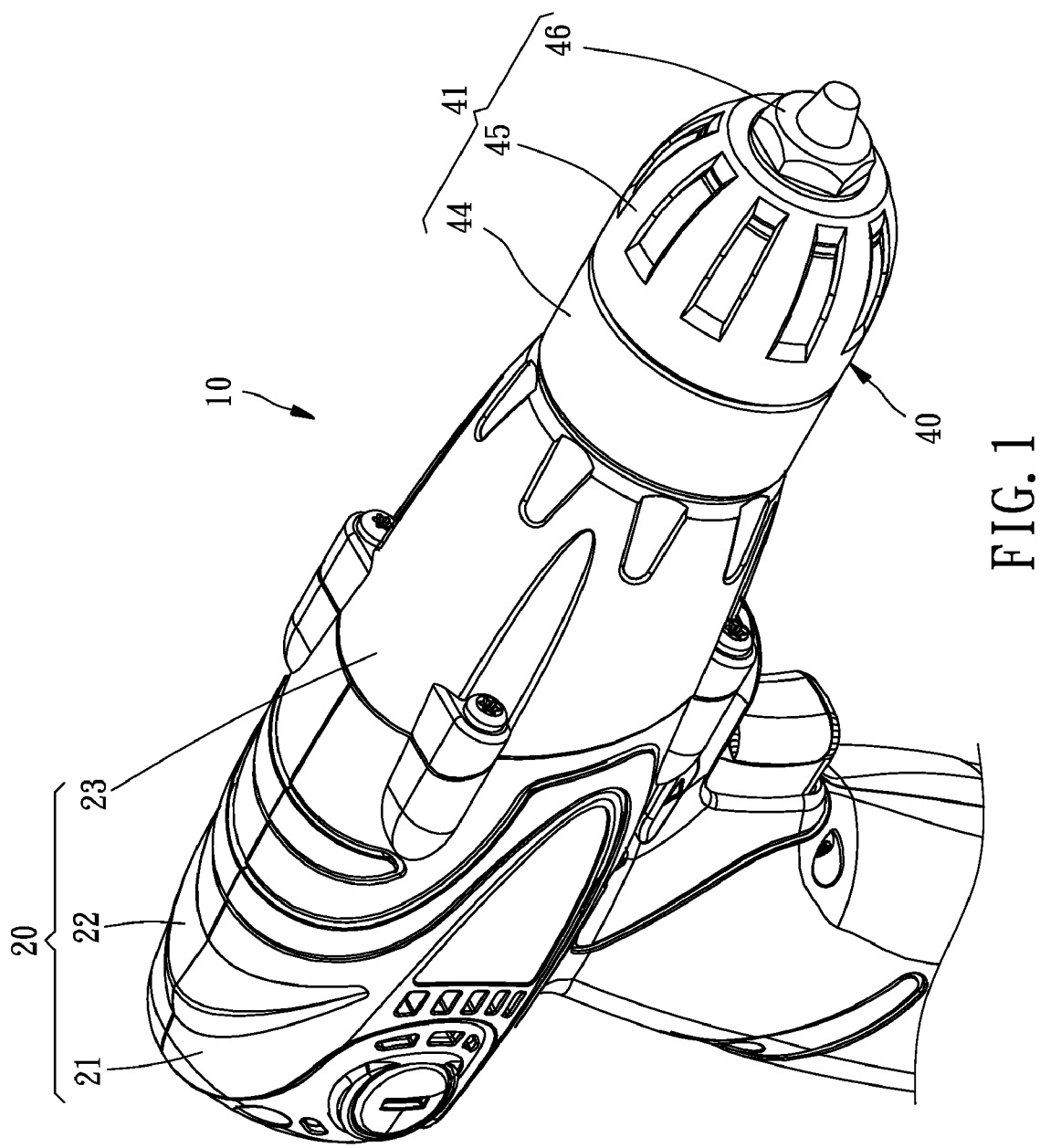
FIG. 1 is an elevational view of an impact drill in accordance with the present invention.
Figure 2:
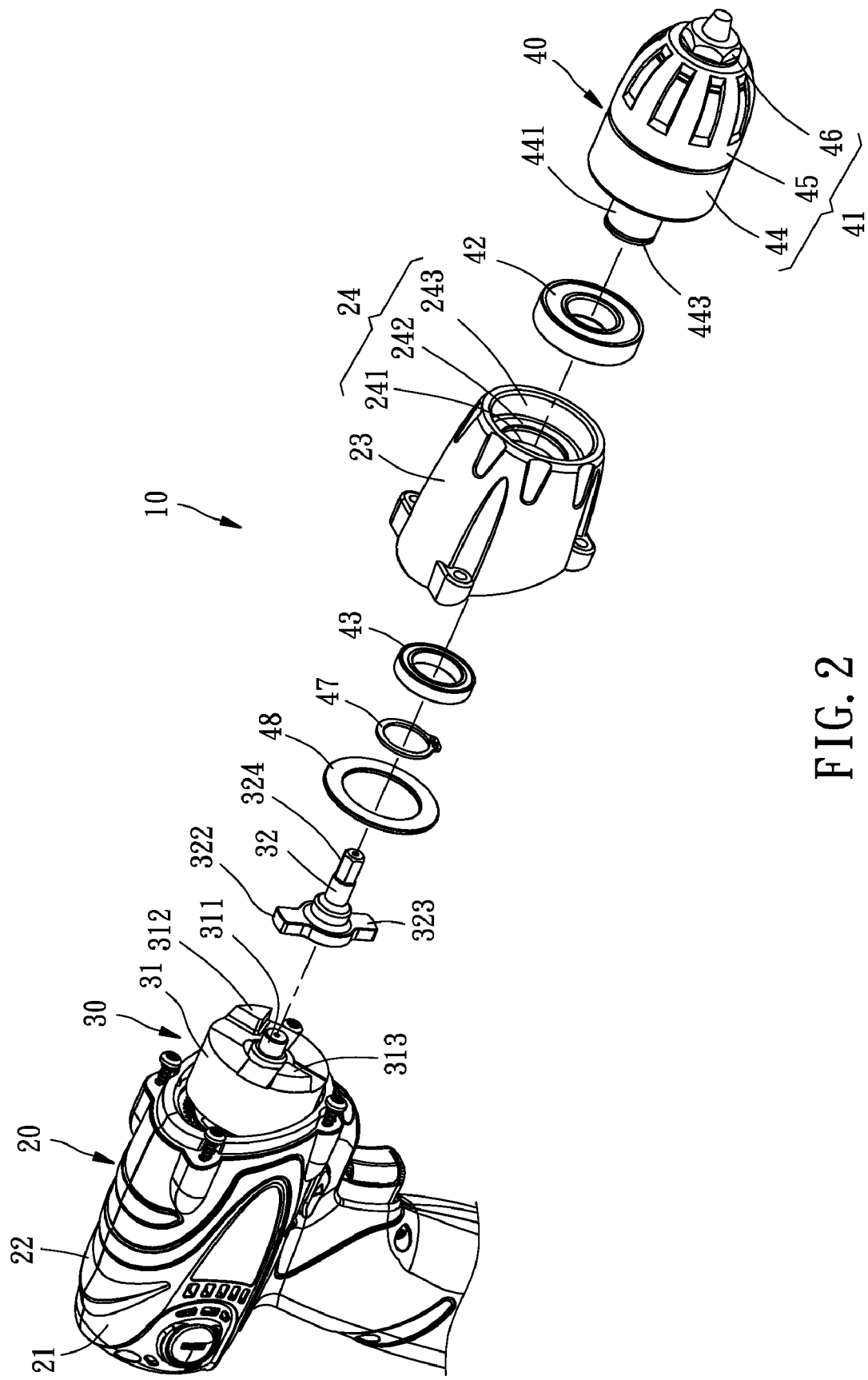
FIG. 2 is an exploded view of the impact in accordance with the present invention.

Referring to FIGS. 1 and 2, an impact drill 10 in accordance with the present invention is shown comprising a housing 20, a driving mechanism 30, a chuck unit 40 and a power supply unit (not shown).

The housing 20 includes two symmetrical half shells 21 and 22, and a front cap 23 capped on the front side of the symmetrical half shells 21 and 22. The two symmetrical half shells 21 and 22 define therein an accommodation chamber (not shown). Further, the front cap 23 has a stepped through hole 24 located on the front side in communication between the accommodation chamber 20 and the outside space. The stepped through hole 24 has arranged in proper order from the front side toward the rear side a small diameter segment 241, an annular step 242 and a big diameter segment 243. The diameter of the small diameter segment 241 is smaller than the big diameter segment 243. The diameter of the annular step 242 is smaller than the small diameter segment 241.

The driving mechanism 30 is accommodated in the accommodation chamber of the housing 20, comprising a motor (not shown), a reducing gear set (not shown), an impact force generating device (not shown) and a transmission shaft 32. The reducing gear set is a planet gear set having the sun gear thereof fastened to the output shaft of the motor, an internal gear and a plurality of planet gears meshed between the sun gear and the internal gear and movable along the internal gear to rotate a gear holder to which the planet gears are pivotally connected. This design of reducing gear set is a known design intensively used in power hand tools. Therefore, further detailed description and illustration are not necessary in this regard. The impact force generating device comprises a spindle (not shown), a spring member (not shown) and an impact wheel 31. The spindle is connected to the gear holder of the reducing gear set and rotatable by the gear holder. The spindle is also connected to the impact wheel 31 for rotating the impact wheel 31. The impact wheel 31 has a pivot shaft 311 located on its center of rotation, and two impact blocks 312 and 313 symmetrically disposed at two opposite sides relative to the pivot shaft 311. The transmission shaft 32 is a rod member having a coupling hole 321 located on the center of the rear side thereof and facing the impact wheel 31 for coupling to the pivot shaft 311. The transmission shaft 32 further has two wing plates 322 and 323 that are respectively set between the two impact blocks 312 and 313 after connection of the transmission shaft 32 to the impact wheel 31. During rotation of the impact wheel 31, the impact blocks 312 and 313 are respectively stopped against the wing plates 322 and 323 to rotate the transmission shaft 32. When the transmission shaft 32 encounters a certain resistance, the impact wheel 31 is forced to move in direction along the axis of the spindle and to release the wing plates 322 and 323 from the constraint of the two impact blocks 312 and 313. The spring member is set between the impact wheel 31 and the spindle to maintain connection between the impact wheel 31 and the transmission shaft 32. When the transmission shaft 32 encounters a certain resistance, the impact wheel 31 conquers the spring force of the spring member and moves in direction along the axis of the spindle away from the transmission shaft 32. Immediately after disconnection of the impact wheel 31 from the transmission shaft 32, the spring member pushes the impact wheel 31 back into connection with the transmission shaft 32, causing the impact blocks 312 and 313 to strike the wing plates 322 and 323 respectively. Thus, repeating this striking action causes the transmission shaft 32 to move in an axial direction intermittently during its rotation, thereby producing an impact force in the direction of rotation intermittently. The aforesaid impact force generating device is of the known art and has been intensively used in handheld impact wrenches. Therefore, no any further detailed description in this regard is necessary. Further, the transmission shaft 32 has a polygonal front segment 324. According to the present preferred embodiment, the polygonal front segment 324 has a hexagonal profile. Alternatively, the polygonal front segment 324 can be a triangular rod or rectangular rod, or any other polygonal design.

Figure 3:
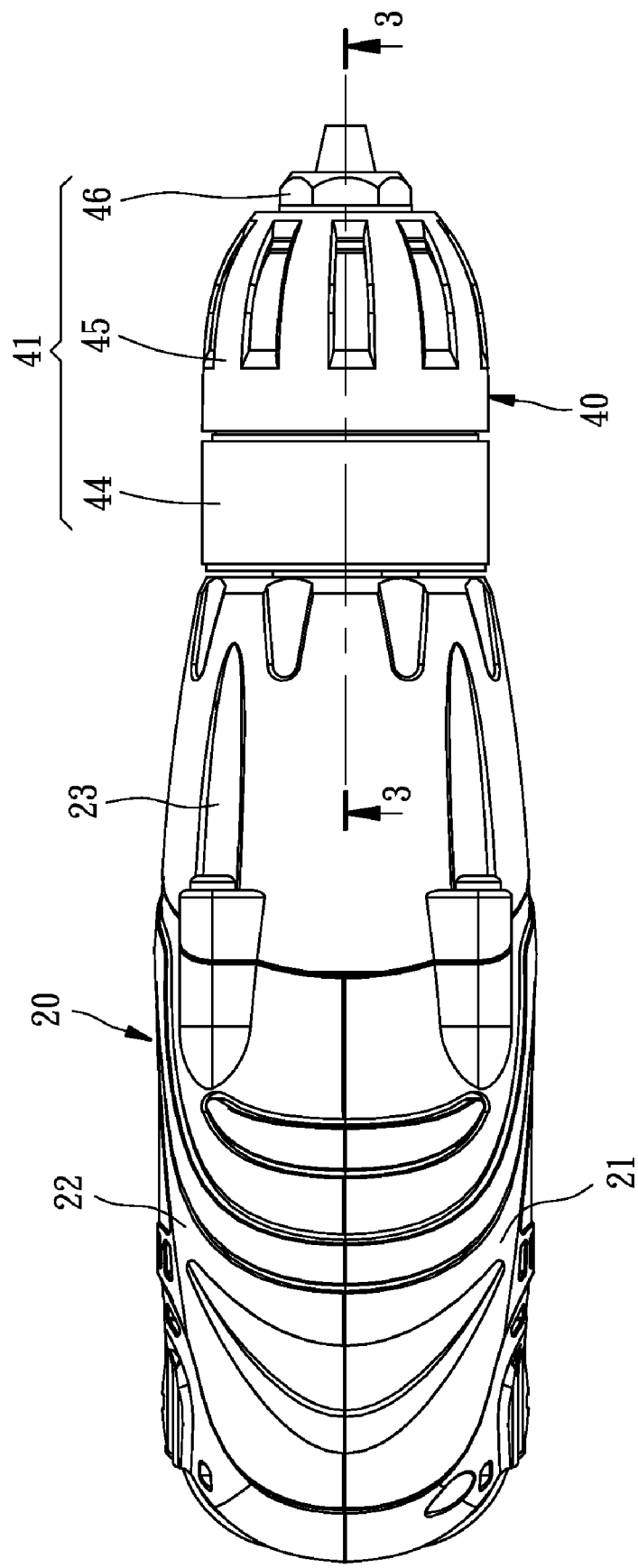
FIG. 3 is a top view of the impact drill in accordance with the present invention.
Figure 4:
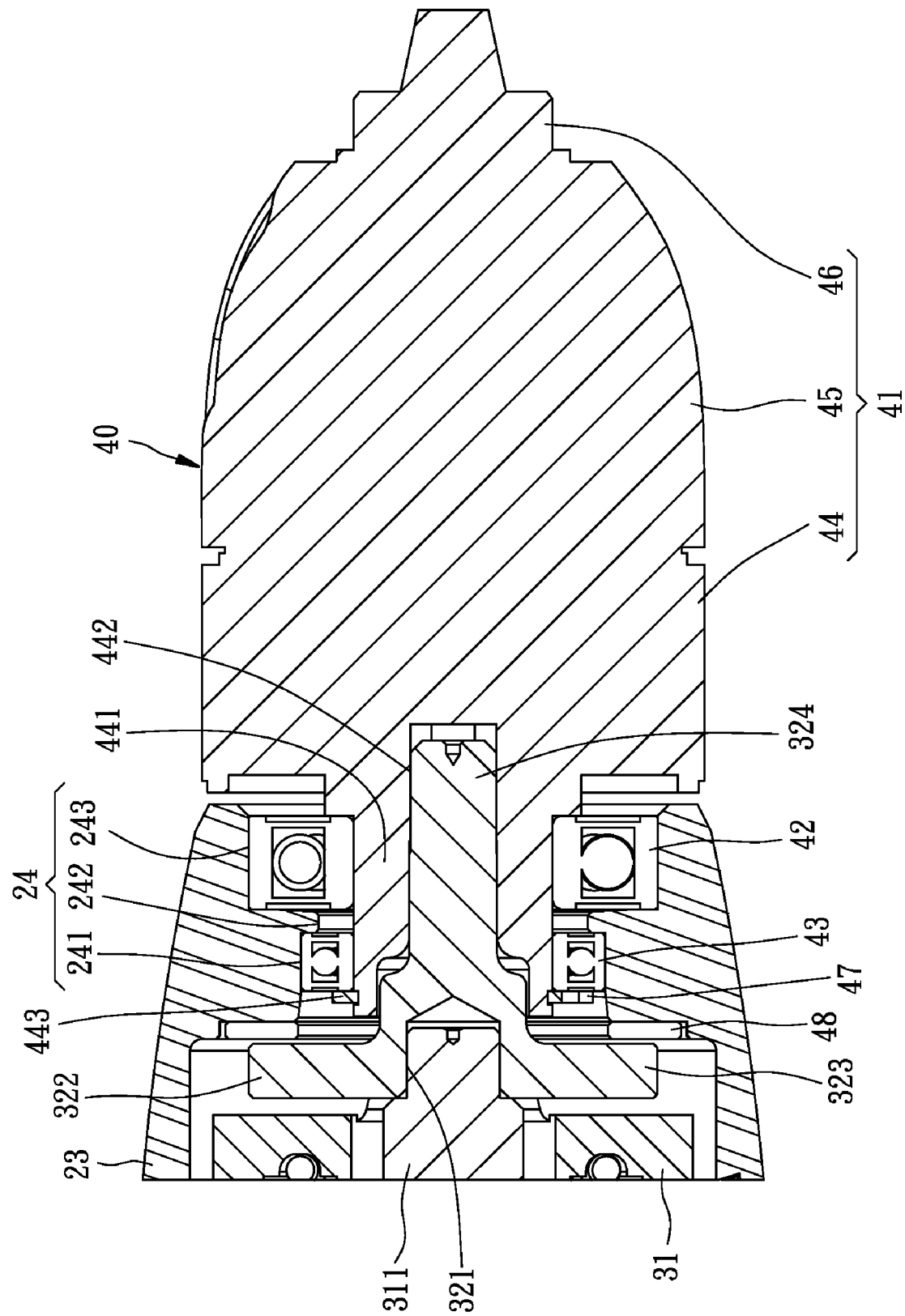
FIG. 4 is a sectional view taken, in an enlarged scale, along line 3-3 of FIG. 2.
Figure 5:
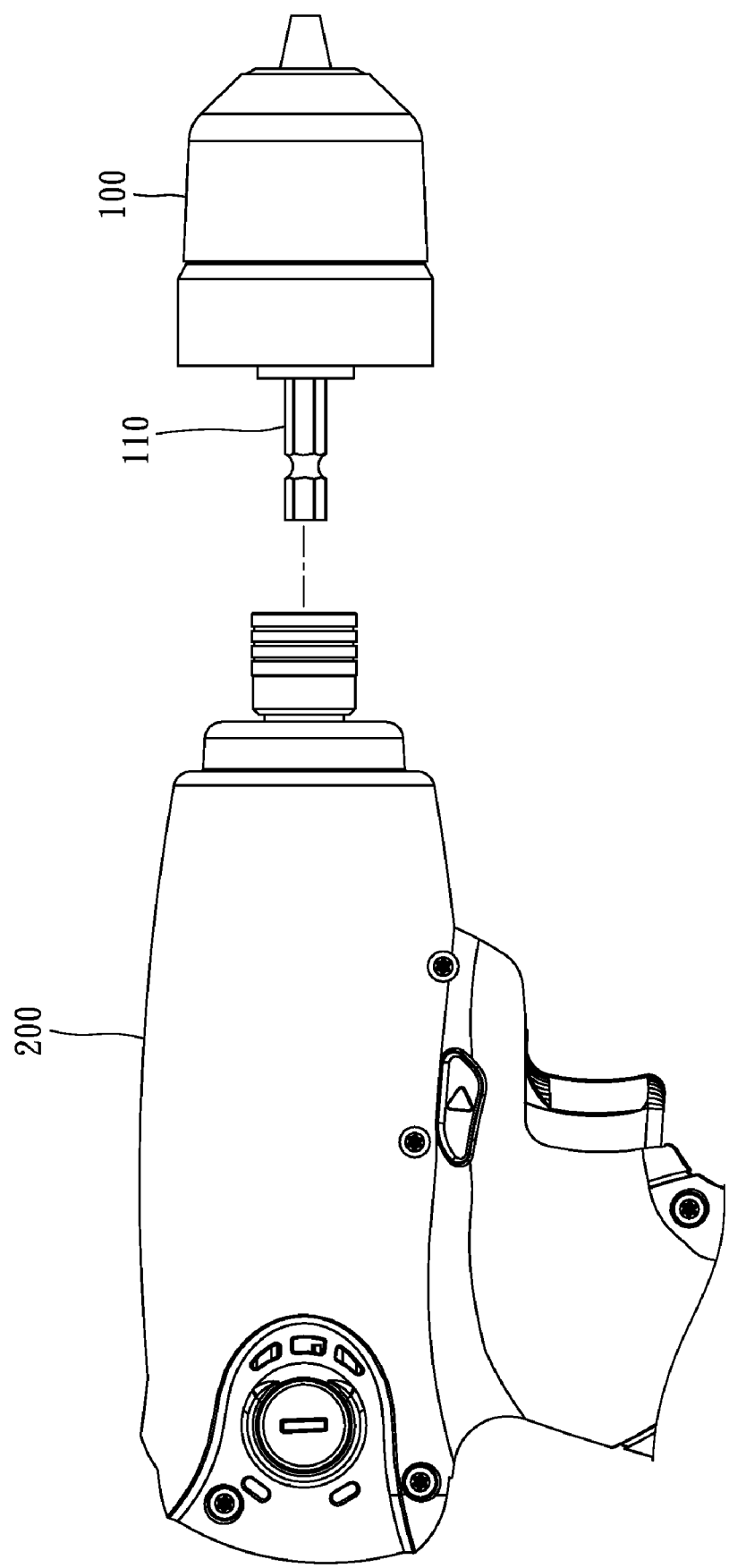
FIG. 5 is an exploded view of an electrical wrench and a drill chuck according to the prior art.
Figure 6:
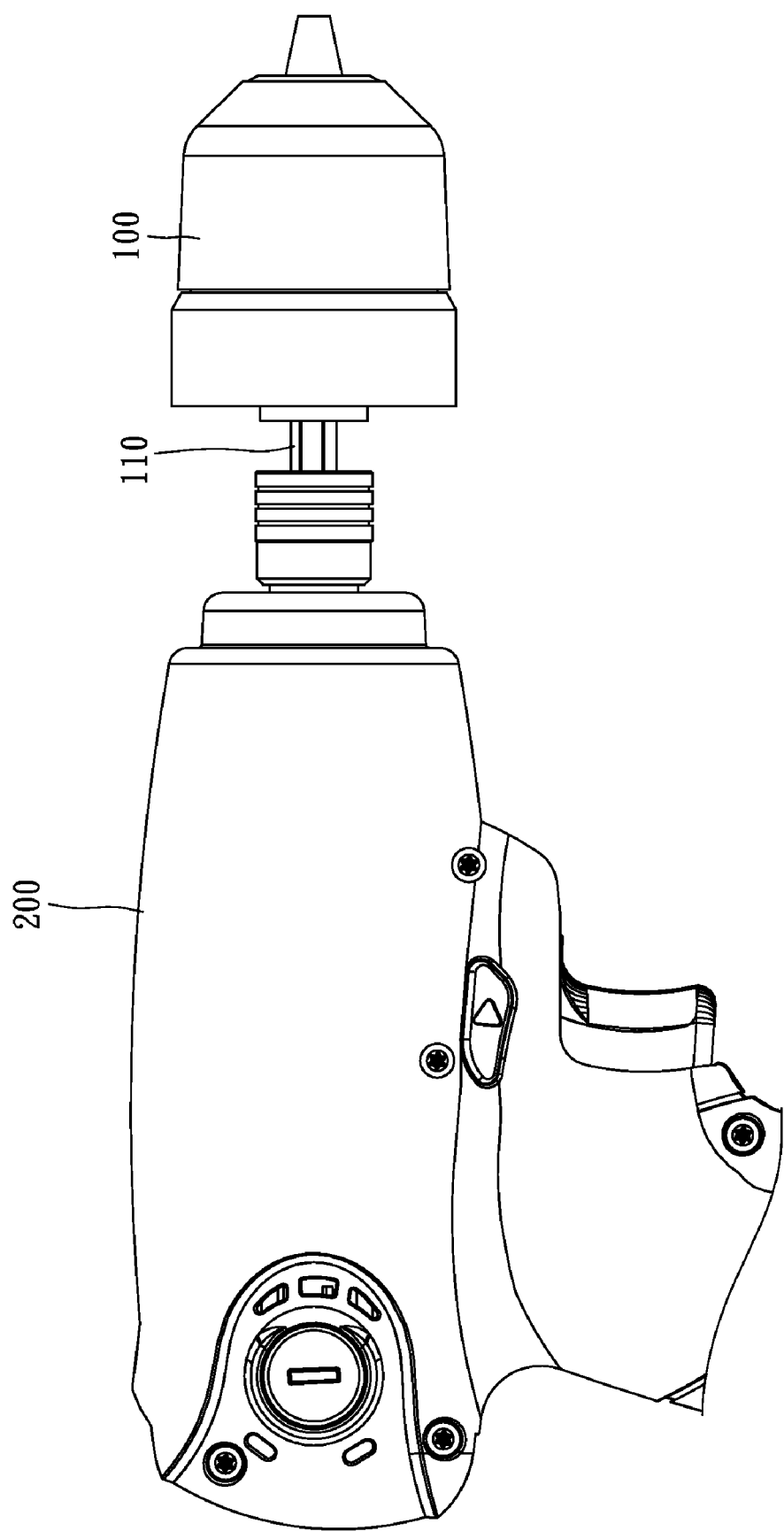
FIG. 6 is an elevational assembly view of FIG. 5.
Figure 7:
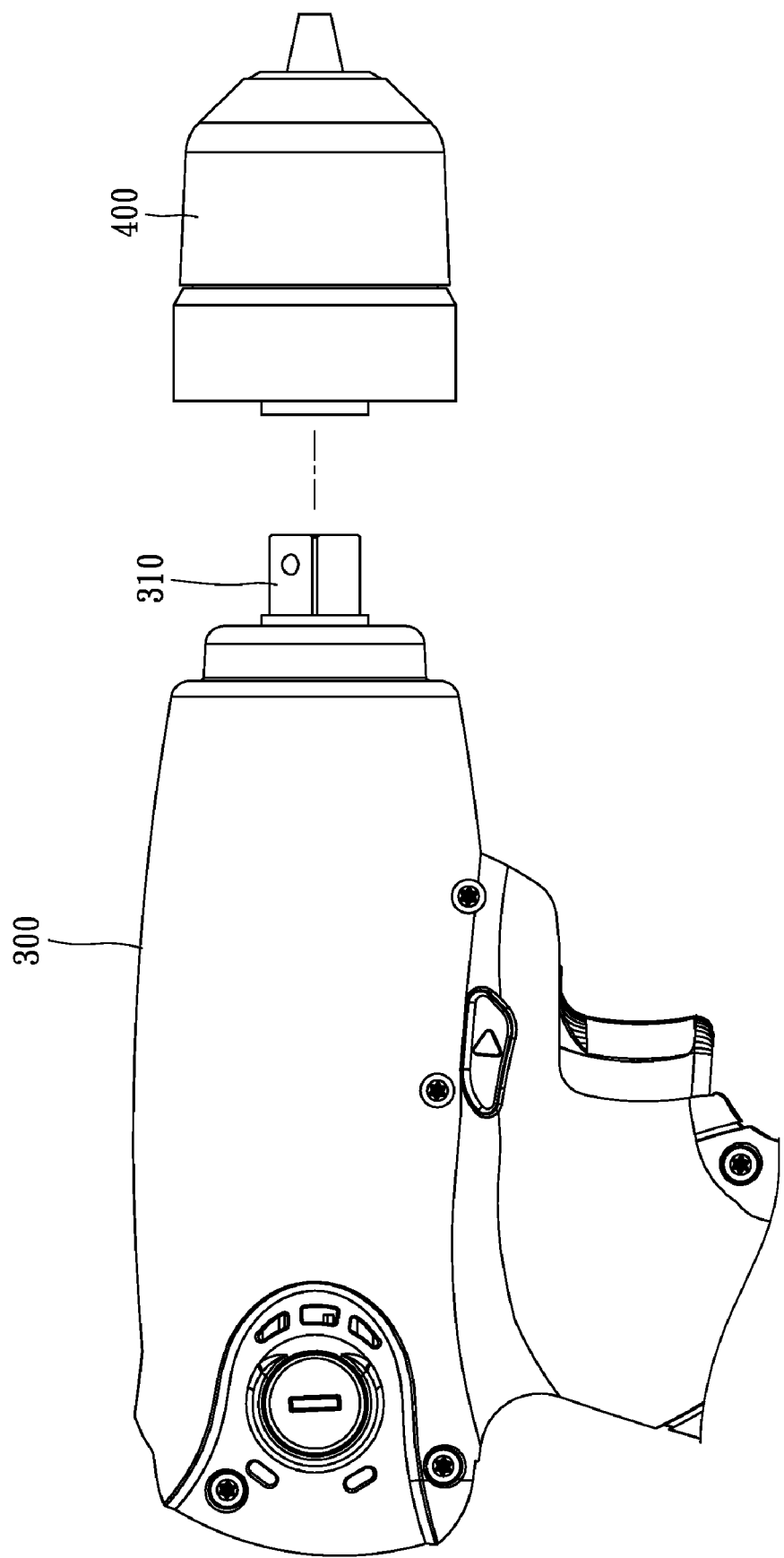
FIG. 7 is an exploded view of another structure of electrical wrench and drill chuck according to the prior art.
Figure 8:
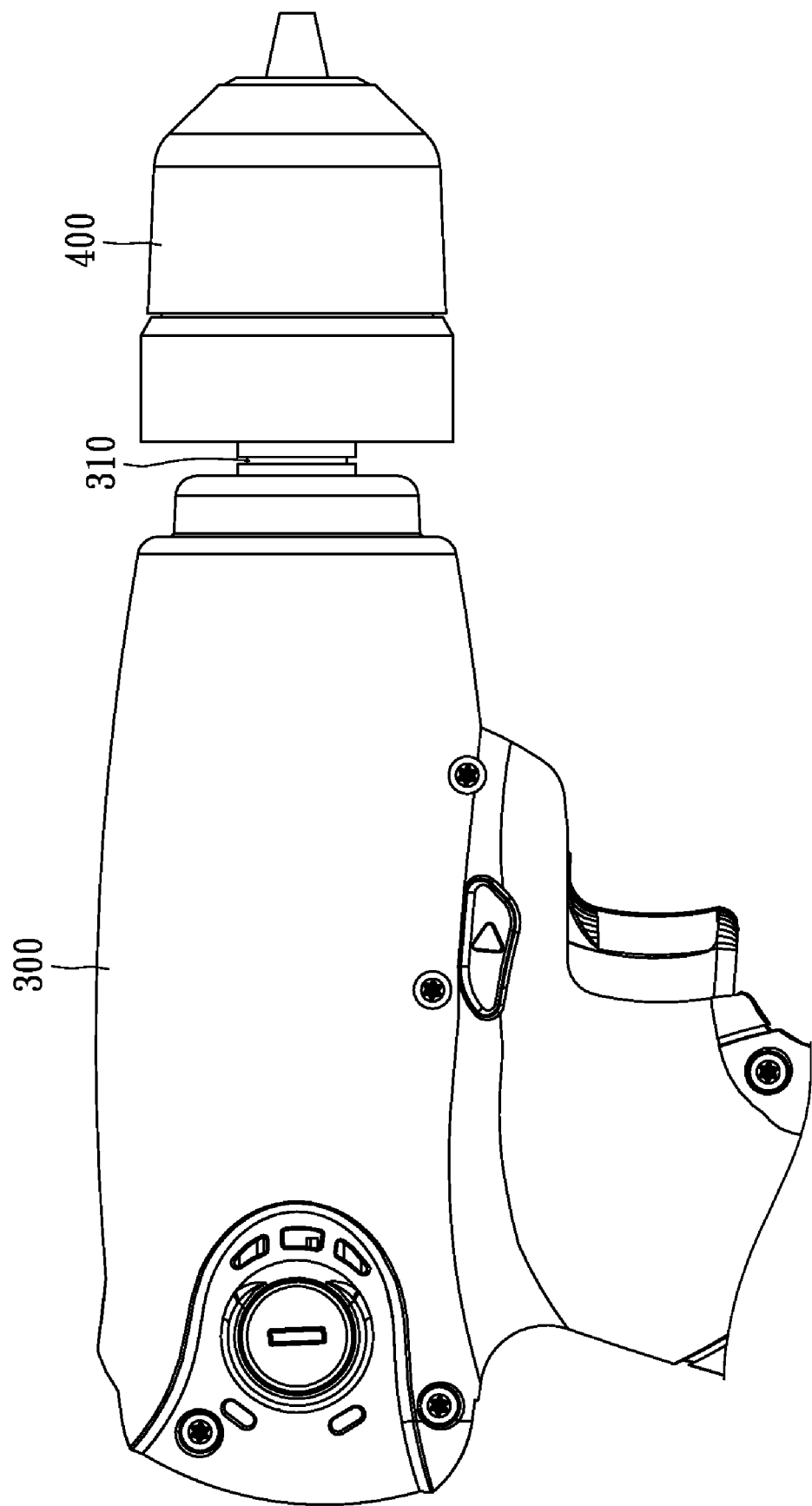
FIG. 8 is an elevational assembly view of FIG. 7.

Referring to FIGS. 3 and 4 and FIGS. 1 and 2 again, the chuck unit 40 comprises a drill chuck 41, a first bearing 42, and a second bearing 43 having an outer diameter smaller than the first bearing 42. The drill chuck 41 has a base 44, a collar 45 pivotally mounted on the base 44 and a set of jaws 46 mounted on the base 44. The jaws 46 partially extend out of the collar 45. By means of rotating the collar 45 clockwise and counter-clockwise, the jaws 46 are forced toward one another to hold down a drill bit (not shown) or moved apart and released from the drill bit. The base 44 has a connection barrel 441 disposed at one side thereof remote from the jaws 46. The connection barrel 441 defines therein a polygonal coupling hole 442 fitting the polygonal front segment 324 of the transmission shaft 32. According to the present preferred embodiment, the polygonal coupling hole 442 is a hexagonal coupling hole. Alternatively, the polygonal coupling hole 42 can be a triangular coupling hole or rectangular coupling hole, or a hole of any other polygonal shaft determined subject to the configuration of the transmission shaft 32. Further, the connection barrel 441 has a locating groove 443 extending around the periphery for the mounting of a C-shaped retainer 47. The first bearing 42 and the second bearing 43 are respectively mounted in the big diameter segment 243 and small diameter segment 241 of the stepped through hole 24 at two sides of the annular step 242. Thus, the chuck unit 40 is connected to the housing 20. At this time, the connection barrel 441 of the chuck unit 40 is suspending in the stepped through hole 24 and the polygonal coupling hole 442 of the connection barrel 441 is press-fitted onto the polygonal front segment 324 of the transmission shaft 32, avoiding relative rotation between the chuck unit 40 and the transmission shaft 32. Further, because the second bearing 43 is stopped between the annular step 242 and the C-shaped retainer 47, the chuck unit 40 is locked to the housing 20 and prohibited from falling out of the housing 20. The chuck unit 40 further has a spacer ring 48 sleeved onto the connection barrel 441 and set between the C-shaped retainer 47 and the wing plates 322 and 323 of the transmission shaft 32.

The power supply unit is mounted in the bottom side of the housing 20. The power supply unit can be a DC battery set. Alternatively, the power supply unit can be a power adapter for receiving an external DC or AC power source. The power supply unit is electrically connected to the driving mechanism 30 to provide the driving mechanism 30 with the necessary working voltage.

After description of the structural features of the impact drill, two technical features of the present invention shall be known as follows:

1. The chuck unit 40 is firmly secured to the other component parts of the impact drill 10. Under normal use, the chuck unit 40 is not detachable and enables the impact drill 10 to output impact, fitting different application requirements to achieve a high performance drilling operation.

2. The chuck unit 40 is coupled to the other component parts of the impact drill 10 by a new connection measure, providing better transmission effect and stability, i.e., the chuck unit 40 is coupled to the stepped through hole 24 of the housing 20 by the first bearing 42 that has a relatively greater outer diameter and the second bearing 43 that has a relatively smaller outer diameter so that the drill chuck 41 is rotatable stably on the connection barrel 441 between the first bearing 42 and the second bearing 43, eliminating the vibration drawback of the prior art designs. Further, the drill chuck 41 is connected to the transmission shaft 32 of the impact generating device by the connection barrel 441 and the polygonal coupling hole 442 of the connection barrel 441 is press-fitted onto the polygonal front segment 324 of the transmission shaft 32, transmission between the drill chuck 41 and the transmission shaft 32 is positive and stable.

What is claimed is:

1. An impact drill comprising:

a housing, said housing comprising an accommodation chamber and a through hole in communication between said accommodation chamber and the space outside said housing;

a driving mechanism accommodated in said accommodation chamber, said driving mechanism comprising a transmission shaft positioned in said through hole for providing a torque and producing an impact force in the direction of rotation intermittently upon a resistance, said transmission shaft having a polygonal front segment extending out of said accommodation chamber; and a chuck unit, said chuck unit comprising a drill chuck and a first bearing, said drill chuck comprising a connection barrel defining therein a polygonal coupling hole press-fitted onto said polygonal front segment of said transmission shaft, and said first bearing mounted on said connection barrel and received in said through hole to secure said drill chuck to said housing.

2. The impact drill as claimed in claim 1, wherein said housing comprises two symmetrical half shells abutted against each other, a front cap capped on said two symmetrical half shells; said accommodation chamber is defined between said two symmetrical half shells; said through hole is formed in said front cap.

3. The impact drill as claimed in claim 1, wherein said driving mechanism further comprises a motor adapted for rotating aid transmission shaft, and an impact generating device set between said motor and said transmission shaft and adapted for causing said transmission shaft to produce an impact force.

4. The impact drill as claimed in claim 1, wherein said polygonal front segment of said transmission shaft is a hexagonal rod; said polygonal coupling hole of said connection barrel is a hexagonal hole.

5. The impact drill as claimed in claim 1, wherein said drill chuck comprises a base, a collar pivotally mounted on said base and a set of jaws mounted on said base and partially extend out of said collar; said connection barrel is located on one side of said base remote from said jaws.

6. The impact drill as claimed in claim 1, wherein said chuck unit further comprises a second bearing mounted on said connection barrel and received in said through hole to secure said drill chuck to said housing, said second bearing having a diameter smaller than said first bearing.

7. The impact drill as claimed in claim 6, wherein said through hole of said housing is a stepped through hole having a small diameter segment adapted for accommodating said second bearing, a big diameter segment adapted for accommodating said first bearing, and an annular step set between said small diameter segment and said big diameter segment, the diameter of said small diameter segment being smaller than said big diameter segment, the diameter of said annular step being smaller than said small diameter segment.

8. The impact drill as claimed in claim 7, wherein said connection barrel has a locating groove extending around the periphery thereof and a C-shaped retainer mounted in said locating groove, said C-shaped retainer is stopped against one side of said second bearing remote from said annular step.

9. The impact drill as claimed in claim 6, wherein said connection barrel has a locating groove extending around the periphery thereof and a C-shaped retainer mounted in said locating groove, said C-shaped retainer is stopped against one side of said second bearing remote from said annular step.

10. The impact drill as claimed in claim 1, wherein said connection barrel has a locating groove extending around the periphery thereof and a C-shaped retainer mounted in said locating groove.

11. The impact drill as claimed in claim 1, further comprising a power supply unit mounted in said housing and electrically connected to said driving mechanism to provide said driving mechanism with the necessary working voltage.

* * * * *